US010582145B2

(12) United States Patent
Ishii et al.

(10) Patent No.: US 10,582,145 B2
(45) Date of Patent: Mar. 3, 2020

(54) PROJECTION SYSTEM, PROJECTION DEVICE, AND CRADLE

(71) Applicant: Sony Corporation, Tokyo (JP)

(72) Inventors: Kazuya Ishii, Tokyo (JP); Shigeru Tanaka, Kanagawa (JP); Minako Kawata, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/462,413

(22) PCT Filed: Sep. 11, 2017

(86) PCT No.: PCT/JP2017/032714
§ 371 (c)(1),
(2) Date: May 20, 2019

(87) PCT Pub. No.: WO2018/123152
PCT Pub. Date: Jul. 5, 2018

(65) Prior Publication Data
US 2019/0356879 A1 Nov. 21, 2019

(30) Foreign Application Priority Data
Dec. 26, 2016 (JP) .................................. 2016-250602

(51) Int. Cl.
*H04N 5/74* (2006.01)
*G03B 21/50* (2006.01)
*G03B 21/00* (2006.01)

(52) U.S. Cl.
CPC .............. *H04N 5/74* (2013.01); *G03B 21/50* (2013.01); *G03B 21/001* (2013.01)

(58) Field of Classification Search
CPC ......... H04N 5/74; G03B 21/50; G03B 21/001
(Continued)

(56) References Cited

U.S. PATENT DOCUMENTS

2006/0023071 A1* 2/2006 Mori .................. H04N 1/00127
348/207.99
2010/0002146 A1  1/2010 Tsukagoshi et al.
(Continued)

FOREIGN PATENT DOCUMENTS

JP     2007101836 A    4/2007
JP     2008072244 A    3/2008
(Continued)

OTHER PUBLICATIONS

International Search Report corresponding to PCT/JP2017/032714, dated Nov. 28, 2017, 3 pgs.

*Primary Examiner* — Jefferey F Harold
*Assistant Examiner* — Mustafizur Rahman
(74) *Attorney, Agent, or Firm* — Lerner, David, Littenberg, Krumholz & Mentlik, LLP

(57) ABSTRACT

To perform highly functional projection with an intuitive operation using a portable terminal.

A projection system includes: a portable terminal; a projection device; and a cradle. The portable terminal detects a change in posture of the portable terminal itself. The projection device reproduces a video signal, and projects video thus reproduced on a projection surface. The cradle supports the projection device. The cradle changes the posture of the projection device in accordance with a detection result of the portable terminal.

10 Claims, 18 Drawing Sheets

(58) Field of Classification Search
USPC .......... 348/581, 738, 739, 744, 333.01, 552; 345/649, 633, 428; 375/240.01
See application file for complete search history.

(56) References Cited

U.S. PATENT DOCUMENTS

| | | | | |
|---|---|---|---|---|
| 2011/0138416 A1* | 6/2011 | Kang | ................... | G06F 3/0482 725/39 |
| 2012/0105477 A1* | 5/2012 | Park | ................... | G06F 3/005 345/633 |
| 2012/0307125 A1* | 12/2012 | Kim | ................... | H04N 9/3141 348/333.1 |
| 2013/0155113 A1 | 6/2013 | Kotani et al. | | |
| 2013/0194495 A1* | 8/2013 | Pan | ................... | G06F 1/1639 348/515 |
| 2013/0314597 A1* | 11/2013 | Kumamoto | ......... | H04N 5/7475 348/552 |
| 2014/0267102 A1* | 9/2014 | Ota | ................... | G09G 5/12 345/173 |
| 2015/0109198 A1* | 4/2015 | Liu | ................... | G06F 3/1454 345/156 |
| 2015/0161767 A1* | 6/2015 | Monden | ................ | G06T 3/60 345/428 |
| 2015/0199166 A1* | 7/2015 | Eguchi | ................ | G06F 3/1454 345/2.2 |
| 2015/0256791 A1* | 9/2015 | Miao | ................... | H04N 7/0117 348/441 |
| 2015/0370526 A1* | 12/2015 | Inagaki | ............... | H04N 9/3188 345/661 |

FOREIGN PATENT DOCUMENTS

| | | |
|---|---|---|
| JP | 2008288682 A | 11/2008 |
| JP | 2009182435 A | 8/2009 |
| JP | 2012138686 A | 7/2012 |
| JP | 2013146049 A | 7/2013 |

\* cited by examiner

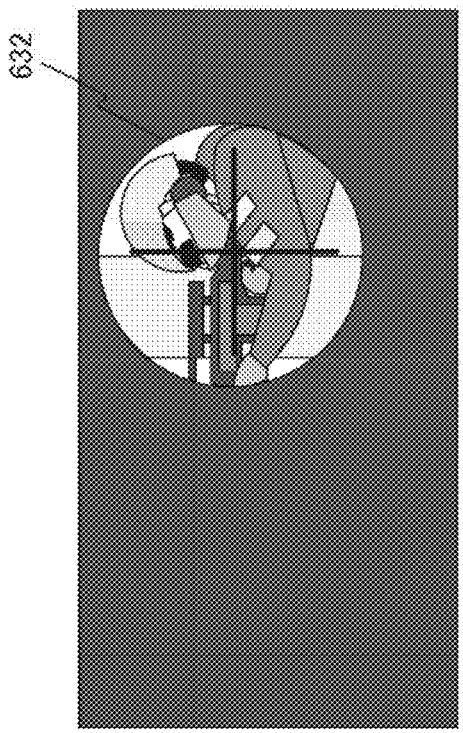
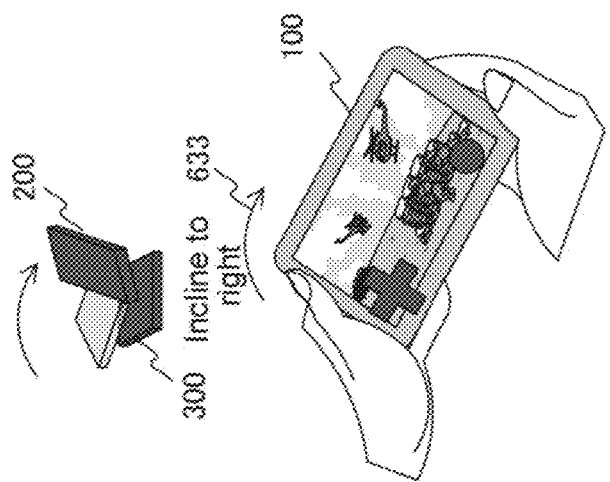
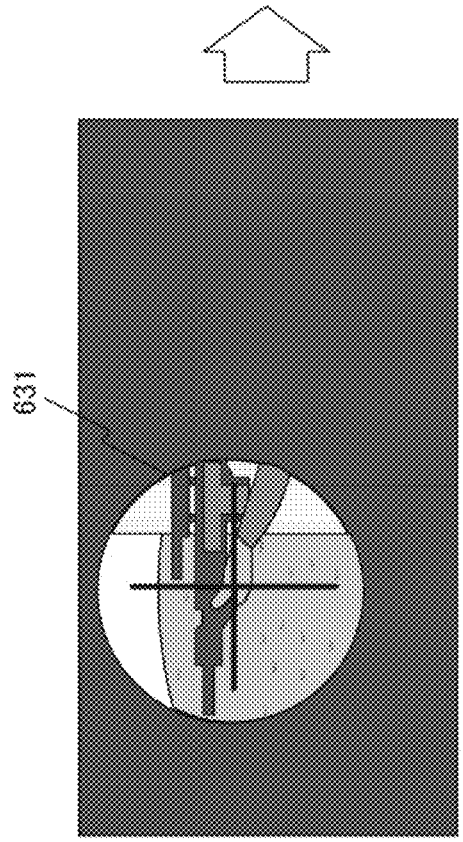
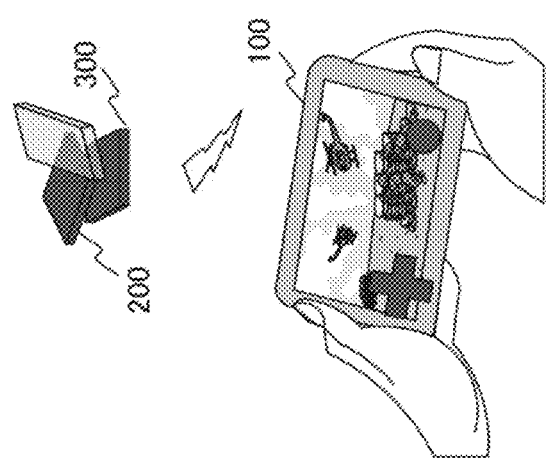
FIG.8

PROJECTION SYSTEM, PROJECTION DEVICE, AND CRADLE

CROSS-REFERENCE TO RELATED APPLICATIONS

This application is a national phase entry under 35 U.S.C. § 371 of International Application No. PCT/JP2017/032714 filed Sep. 11, 2017, which claims the priority from Japanese Patent Application No. 2016-250602 filed in the Japanese Patent Office on Dec. 26, 2016, the entire contents of which are hereby incorporated by reference.

TECHNICAL FIELD

The present technology relates to a projection system. More specifically, the present technology relates to a projection device that projects video, a cradle that changes posture of the projection device, and a projection system including them.

BACKGROUND ART

In the past, a projector that projects an image on a projection surface such as a screen and a wall surface has been widely used. Further, also one in which the function of this projector is incorporated into a portable electronic apparatus has been known. For example, a portable electronic apparatus that has the function of a projector and changes the projection content and display content of the projector in accordance with the change in posture of the portable electronic apparatus and the amount of the change has been proposed (see, for example, Patent Literature 1).

CITATION LIST

Patent Literature

Patent Literature 1: Japanese Patent Application Laid-open No. 2012-138686

DISCLOSURE OF INVENTION

Technical Problem

In the above-mentioned related art, the projection content and display content are changed in accordance with an intuitive operation of changing posture of the portable electronic apparatus by a user. However, in the case where the apparatus that is directly operated by the user and the apparatus that performs projection are integrated, the user needs to always be aware of the projection surface, which may cause inconvenient situations in actual use. Further, in the case where the function of a projector is added as a part of the function of the portable electronic apparatus, it is inferior to a dedicated projector in terms of performance such as the resolution and amount of light emission.

The present technology has been made in view of such circumstances, and it is an object of the present technology to perform highly functional projection with an intuitive operation by a portable terminal.

Solution to Problem

The present technology has been made to solve the above-mentioned problems, and a first aspect thereof is a projection system including a portable terminal that detects a change in posture of the portable terminal itself; a projection device that reproduces a video signal, and projects the video signal on a projection surface; and a cradle that supports the projection device, and changes posture of the projection device in accordance with a detection result of the portable terminal. This brings about the effect of changing posture of the projection device in accordance with the detection result of the portable terminal.

Further, in this first aspect, the portable terminal may detect the change in posture by using at least one of an acceleration sensor or a gyro sensor. This brings about the effect of detecting the change in posture with at least one of the acceleration or the angular velocity.

Further, in this first aspect, the cradle may include a motor that changes the posture of the projection device, and a motor driving unit that drives the motor, and one of the portable terminal, the projection device, and the cradle may include a control signal generation unit that generates a control signal for driving the motor on a basis of the change in posture of the portable terminal. This brings about the effect of changing posture of the projection device by driving the motor of the cradle.

Further, in this first aspect, the portable terminal may supply the video signal to the projection device. This brings about the effect of projecting the video signal supplied from the video signal from the projection device.

Further, in this first aspect, the projection device may include a storage unit that stores the video signal, and read the video signal from the storage unit to perform the reproduction. This brings about the effect of projecting the video signal stored in the storage unit of the projection device.

Further, in this first aspect, the portable terminal may include a first audio output unit, the projection device may include a second audio output unit, and the first and the second audio output units may output different audio signals corresponding to the video signal. This brings about the effect of causing the portable terminal and the projection device to output different audio signals.

Further, in this first aspect, the projection system may include a plurality of sets, each of the plurality of sets including the portable terminal, the projection device, and the cradle. This brings about the effect of causing the projection device to project different video in accordance with the detection results of the plurality of portable terminals.

Further, a second aspect of the present technology is a projection device including a detection signal reception unit that receives a change in posture of a portable terminal as a detection result; a control signal generation unit that generates a control signal for changing posture of the projection device itself on a basis of the detection result; a control signal transmission unit that transmits the control signal to a cradle for supporting the projection device itself; and a projection unit that projects a video signal in a projection direction based on the detection result. This brings about the effect of changing posture of the projection device by driving the motor of the cradle in accordance with the detection result of the portable terminal.

Further, a third aspect of the present technology is a projection device including a detection signal reception unit that receives a change in posture of a portable terminal as a detection result; a control signal generation unit that generates a control signal for changing posture of the projection device itself on a basis of the detection result; a motor that changes the posture of the projection device; a motor driving unit that drives the motor in accordance with the control signal; and a projection unit that projects a video signal in a projection direction based on the detection result. This brings about the effect of changing posture of the projection device by driving the motor of the projection device in accordance with the detection results of the portable terminal.

Further, a fourth aspect of the present technology is a cradle that supports a projection device, including: a detection signal reception unit that receives a change in posture of a portable terminal as a detection result; a motor that changes posture of the projection device; a control signal generation unit that generates a control signal for driving the motor on a basis of the detection result; and a motor driving unit that drives the motor in accordance with the control signal. This brings about the effect of changing posture of the projection device by driving the motor of the cradle in accordance with the detection result of the portable terminal.

Advantageous Effects of Invention

In accordance with the present technology, it is possible to achieve an excellent effect that highly functional projection can be performed with an intuitive operation by a portable terminal. It should be noted that the effect described here is not necessarily limitative and may be any effect described in the present disclosure.

BRIEF DESCRIPTION OF DRAWINGS

FIG. 8 is a diagram showing a third example of the projection system according to the first embodiment of the present technology.

MODE(S) FOR CARRYING OUT THE INVENTION

Hereinafter, embodiment for carrying out the present technology (hereinafter, referred to as embodiments) will be described. Description will be made in the following order.

1. First Embodiment (Example of transmitting a change in posture of a portable terminal to a projection device)
2. Second Embodiment (Example of transmitting a change in posture of a portable terminal to a cradle)
3. Third Embodiment (Example in which a projection device changes posture thereof)

<1. First Embodiment>

[Configuration of Projection System]

Figure 1:
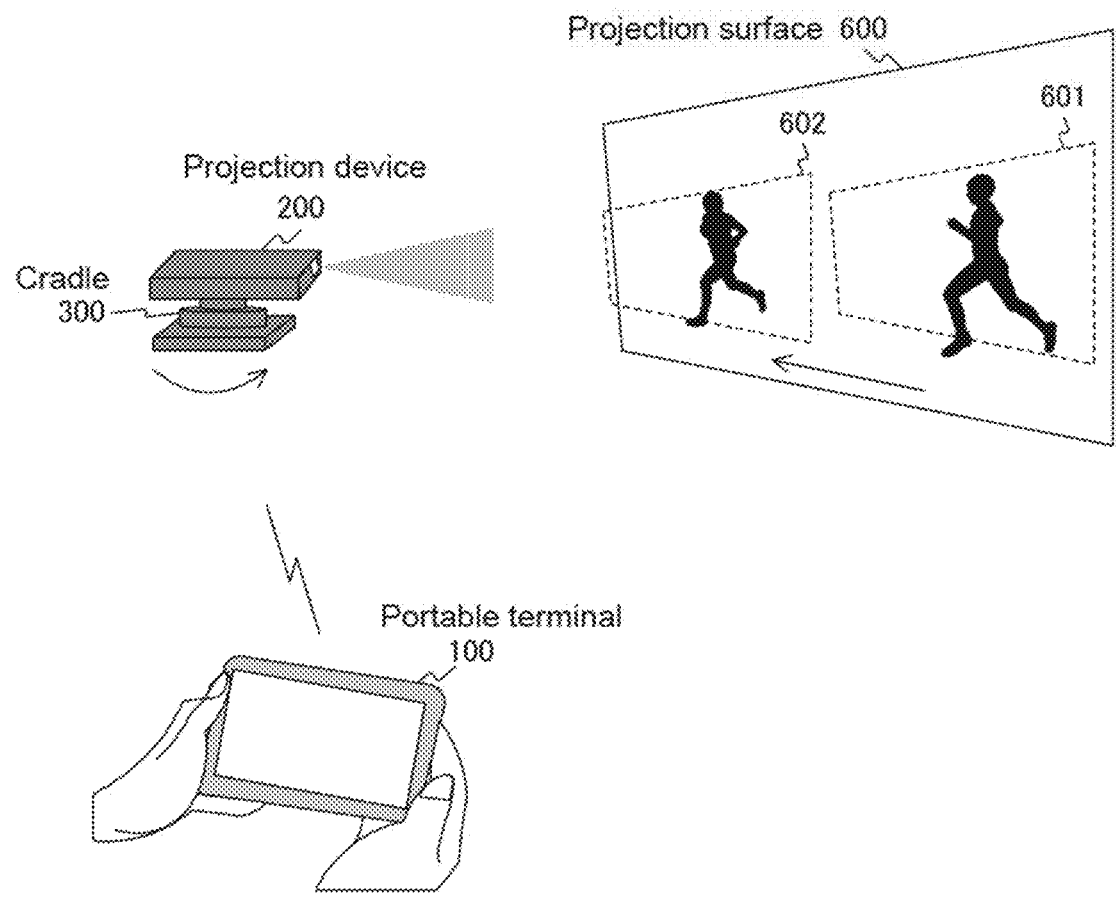
FIG. 1 is a diagram showing a configuration example of an entire projection system according to an embodiment of the present technology.

FIG. 1 is a diagram showing a configuration example of an entire projection system in an embodiment of the present technology. This projection system includes a portable terminal 100, a projection device 200, and a cradle 300.

The portable terminal 100 is a portable terminal apparatus to be operated by a user. For example, a smartphone, a tablet terminal, or the like is assumed. The user holds this portable terminal 100, and performs an operation while changing posture of the portable terminal 100 vertically and horizontally. This change in posture of the portable terminal 100 is detected in the portable terminal 100, and the detection result is transmitted to the outside of the portable terminal 100.

The projection device 200 reproduces a video signal, and projects it on a projection surface 600. This projection device 200 is mounted on the cradle 300 at the time of projection.

The cradle 300 supports the projection device 200 to be mounted. This cradle 300 includes a motor, and is capable of rotating vertically and horizontally in accordance with the detection result of the portable terminal 100. That is, the posture of the projection device 200 changes by the operation of the cradle 300.

For example, when the portable terminal 100 is horizontally moved in the left direction or is inclined in the left direction in the case where video is projected at a position 601 of the projection surface 600, the change in posture of the portable terminal 100 is detected in the portable terminal 100. The detection result is transmitted to the outside of the portable terminal 100, and supplied to the cradle 300 directly or via the projection device 200. The cradle 300 rotates in the direction corresponding to the change in posture to change the posture of the projection device 200. As a result, the projection position of the image by the projection device 200 changes from the position 601 to a position 602.

Figure 2:
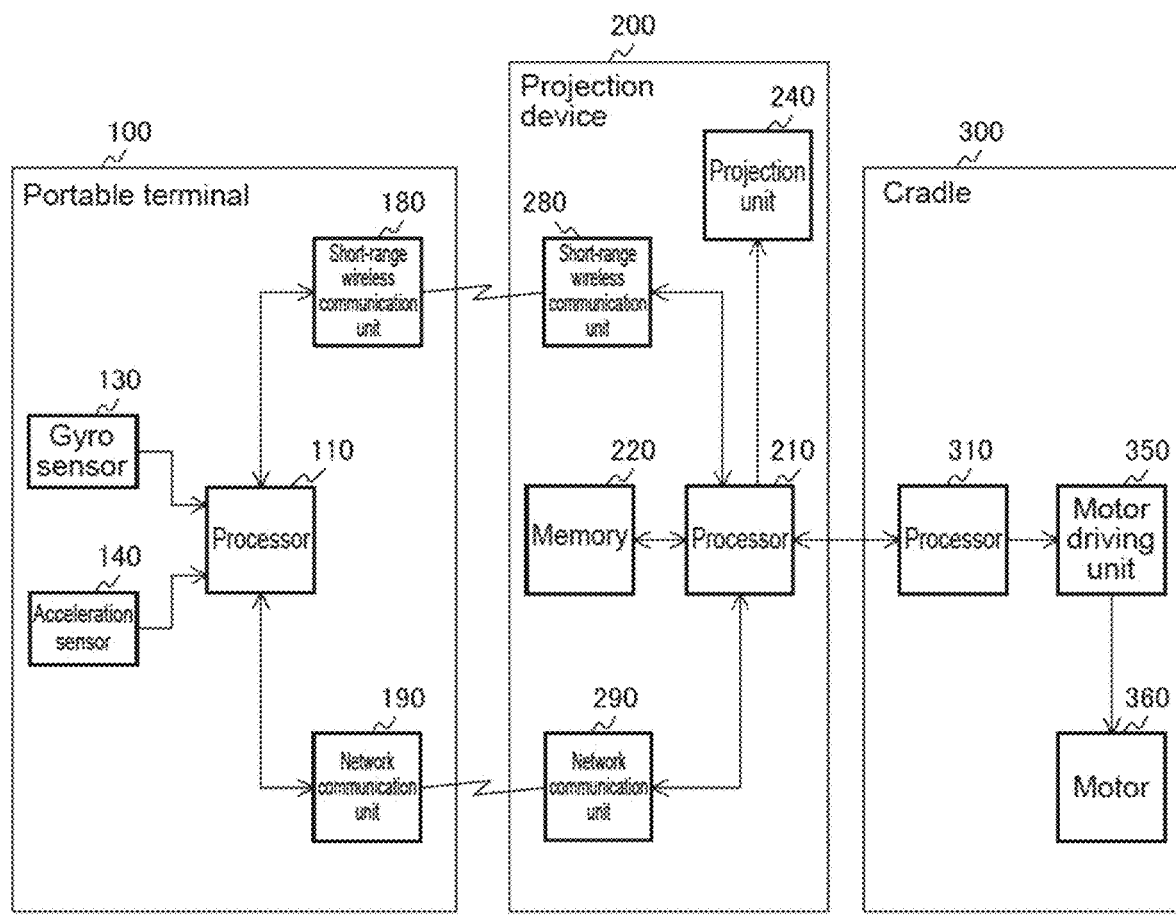
FIG. 2 is a diagram showing a functional configuration example of a projection system according to a first embodiment of the present technology.

FIG. 2 is a diagram showing a functional configuration example of the projection system according to the first embodiment of the present technology. In this first embodiment, the detection result of the change in posture detected in the portable terminal 100 is supplied to the cradle 300 via the projection device 200.

The portable terminal 100 includes a processor 110, a gyro sensor 130, an acceleration sensor 140, a short-range wireless communication unit 180, and a network communication unit 190. The processor 110 is a processing device that controls the respective units of the portable terminal 100.

The gyro sensor 130 is an angular velocity sensor that detects an angular velocity of the portable terminal 100 in the three-dimensional direction. This gyro sensor 130 outputs, in the case where the portable terminal 100 is rotated in in a certain direction, the angular velocity of the rotation. This angular velocity acquired by the gyro sensor 130 is an angle per unit time.

The acceleration sensor 140 is an acceleration sensor that detects an acceleration of the portable terminal 100 in the three-dimensional direction. This acceleration sensor 140 outputs, in the case where the portable terminal 100 is moved in a certain direction, the acceleration of the movement. This acceleration acquired by the acceleration sensor 140 is a rate at which the velocity changes per unit time.

By combining the detection results of the gyro sensor 130 and the acceleration sensor 140, it is possible to detect the direction of inclination in the case where the portable terminal 100 is inclined or the direction of movement in the case where the portable terminal 100 is moved. For example, in the case where the user holding the portable terminal 100 moves (slides) the portable terminal 100 to the right and left in parallel, the direction of the movement is detected. Further, in the case where the user holding the portable terminal 100 inclines the portable terminal 100 to the right and left, the direction of the inclination is detected. Further, since the acceleration to be detected differs between the case where the user holding the portable terminal 100 inclines the portable terminal 100 forward and backward in the front and the case where the user largely swings the portable terminal 100 up and down, both of them can be distinguished by referring to the result detected by the acceleration sensor 140.

Note that although the gyro sensor 130 and the acceleration sensor 140 have been illustrated as sensors provided in the portable terminal 100 here, the portable terminal 100 may include another sensor such as an air pressure sensor and a geomagnetic sensor.

The short-range wireless communication unit 180 performs short-range wireless communication with the projection device 200. Here, for example, "Bluetooth (registered trademark) Low Energy" is assumed as the short-range wireless communication. In general, in the short-range wireless communication, in order to keep power consumption low, the data transfer rate is also set to low. For that reason, in this embodiment, assumption is made that the short-range wireless communication unit 180 is used for transmitting not a video signal but the detection results acquired by the gyro sensor 130 and the acceleration sensor 140. Note that although the case where the detection results acquired by the gyro sensor 130 and the acceleration sensor 140 are transferred through short-range wireless communication has been assumed in this embodiment, they may be transferred through other wireless communication such as a wireless LAN or wired connection.

The network communication unit 190 performs network communication with the projection device 200. Here, for example, a wireless LAN such as WiFi (registered trademark) is assumed as the network communication. In this embodiment, assumption is made that the network communication unit 190 is used for transferring a video signal.

The projection device 200 includes a processor 210, a memory 220, a projection unit 240, a short-range wireless communication unit 280, and a network communication unit 290.

The processor 210 is a processing device that controls the respective units of the projection device 200. The memory 220 is a memory that stores data and the like necessary for the operation of the processor 210. For example, the memory 220 stores the video signal received from the portable terminal 100. The processor 210 performs processing of reproducing the video signal stored in the memory 220. Note that the memory 220 is an example of a storage unit described in the claims.

The projection unit 240 projects video reproduced by the processor 210 on a projection surface. This projection unit 240 uses a light source such as a lamp and a laser to project image on the projection surface. In particular, in the case of using a laser light source, since the point drawing is performed by scanning on the projection surface, it is possible to focus on all positions of the projection surface without brightening the black part.

The short-range wireless communication unit 280 performs short-range wireless communication with the portable terminal 100. This short-range wireless communication unit 280 receives the detection results by the gyro sensor 130 and the acceleration sensor 140, which are transmitted from the portable terminal 100, and supplies the detection results to the processor 210.

The network communication unit 290 performs network communication with the portable terminal 100. This network communication unit 290 receives the video signal transferred from the portable terminal 100, and supplies the video signal to the processor 210.

The cradle 300 includes a processor 310, a motor driving unit 350, and a motor 360.

The processor 310 is a processing device that controls the respective units of the cradle 300. The motor 360 is a power source that generates power for causing the projection device 200 mounted on the cradle 300 to rotate vertically and horizontally. For example, a stepping motor is assumed as the motor 360. The motor driving unit 350 is a mechanism for driving the motor 360.

In the state where the projection device 200 is mounted on the cradle 300, the processor 310 and the processor 210 are electrically connected. Therefore, the processor 310 of the cradle 300 is capable of receiving, from the processor 210 of the projection device 200, the detection results by the gyro sensor 130 and the acceleration sensor 140. The processor 310 generates a control signal that changes posture of the projection device 200 in accordance with the detection results. The motor driving unit 350 drives the motor 360 in accordance with the generated control signal. As a result, the projection position of video by the projection device 200 changes on the basis of the change in posture of the portable terminal 100.

Note that the processors 110, 210, and 310 are each an example of a control signal generation unit described in claims. Further, the processor 210 is an example of a control signal transmission unit describe in claims. Further, the processor 310 is an example of a detection signal reception unit described in claims.

[Operation of Projection System]

Figure 3:
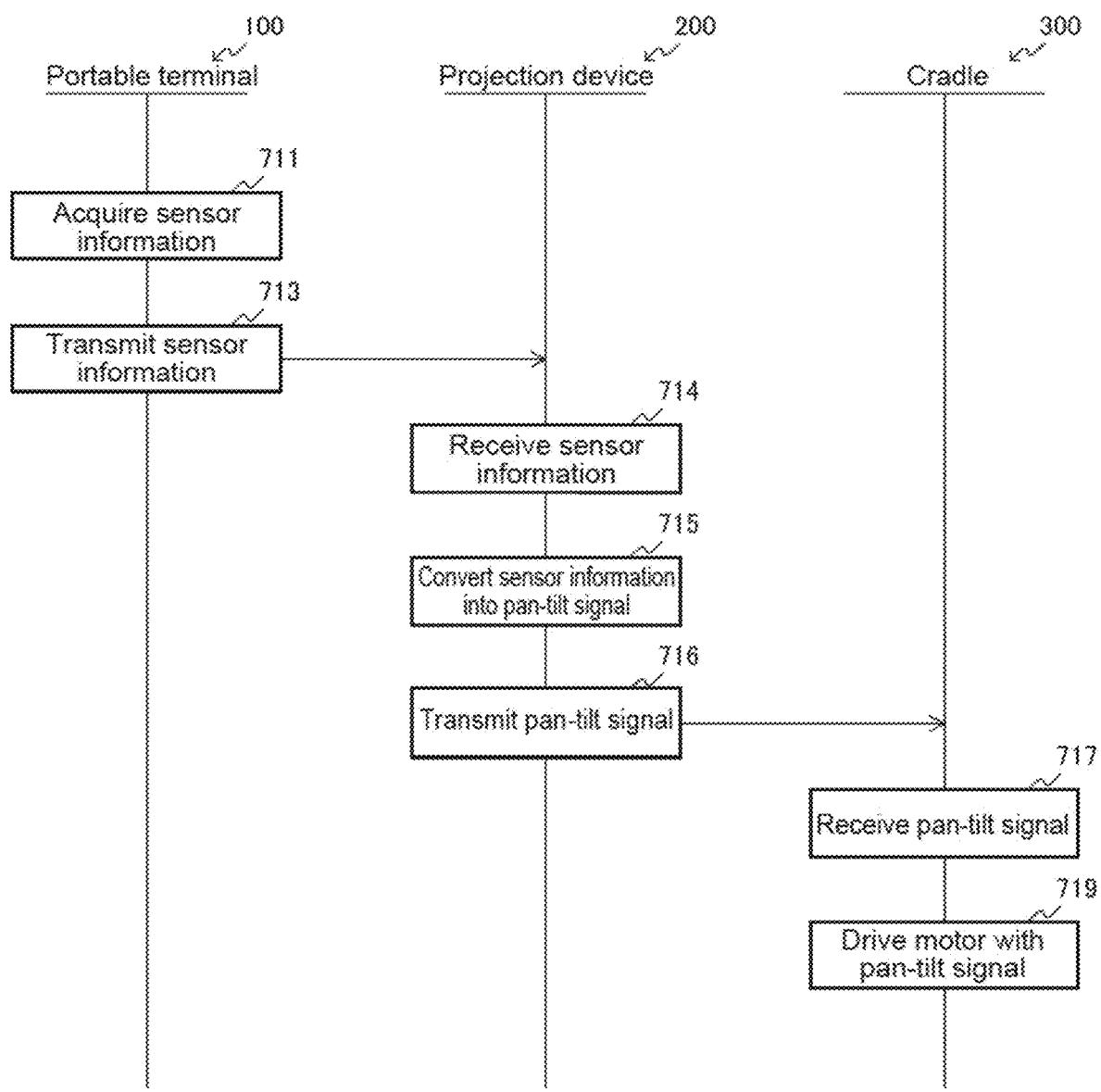
FIG. 3 is a sequence diagram showing a first example of an operation of the projection system according to the first embodiment of the present technology.

FIG. 3 is a sequence diagram showing a first example of the operation of the projection system according to the first embodiment of the present technology. Although the following description focuses on the transmission of detection results, in parallel with this, a video signal is transferred from the portable terminal 100 to the projection device 200 and projection is performed by the projection unit 240 as described above.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (711). The short-range wireless communication unit 180 of the portable terminal 100 transmits this sensor information to the projection device 200 (713).

The short-range wireless communication unit 280 of the projection device 200 receives the sensor information from the portable terminal 100 (714). The processor 210 of the projection device 200 converts the received sensor information into a pan-tilt signal for driving a motor (715). That is, the change in posture of the portable terminal 100 is recognized on the basis of sensor information, and a pan-tilt signal of the motor 360 of the cradle 300 is generated so that the operation corresponding to the change in posture is performed. For example, if the motor 360 is a stepping motor, the processor 210 generates the deceleration ratio. The processor 210 of the projection device 200 transmits the pan-tilt signal to the cradle 300 through electrical connection (716). Note that the pan-tilt signal is an example of a control signal for driving a motor described in claims. The pan indicates the operation of swinging in the right and left direction, and the tilt indicates the operation of swinging in the up and down direction.

The processor 310 of the cradle 300 receives the pan-tilt signal from the projection device 200 (717). The processor 310 supplies the pan-tilt signal to the motor driving unit 350. The motor driving unit 350 drives the motor 360 with the pan-tilt signal (719).

Figure 4:
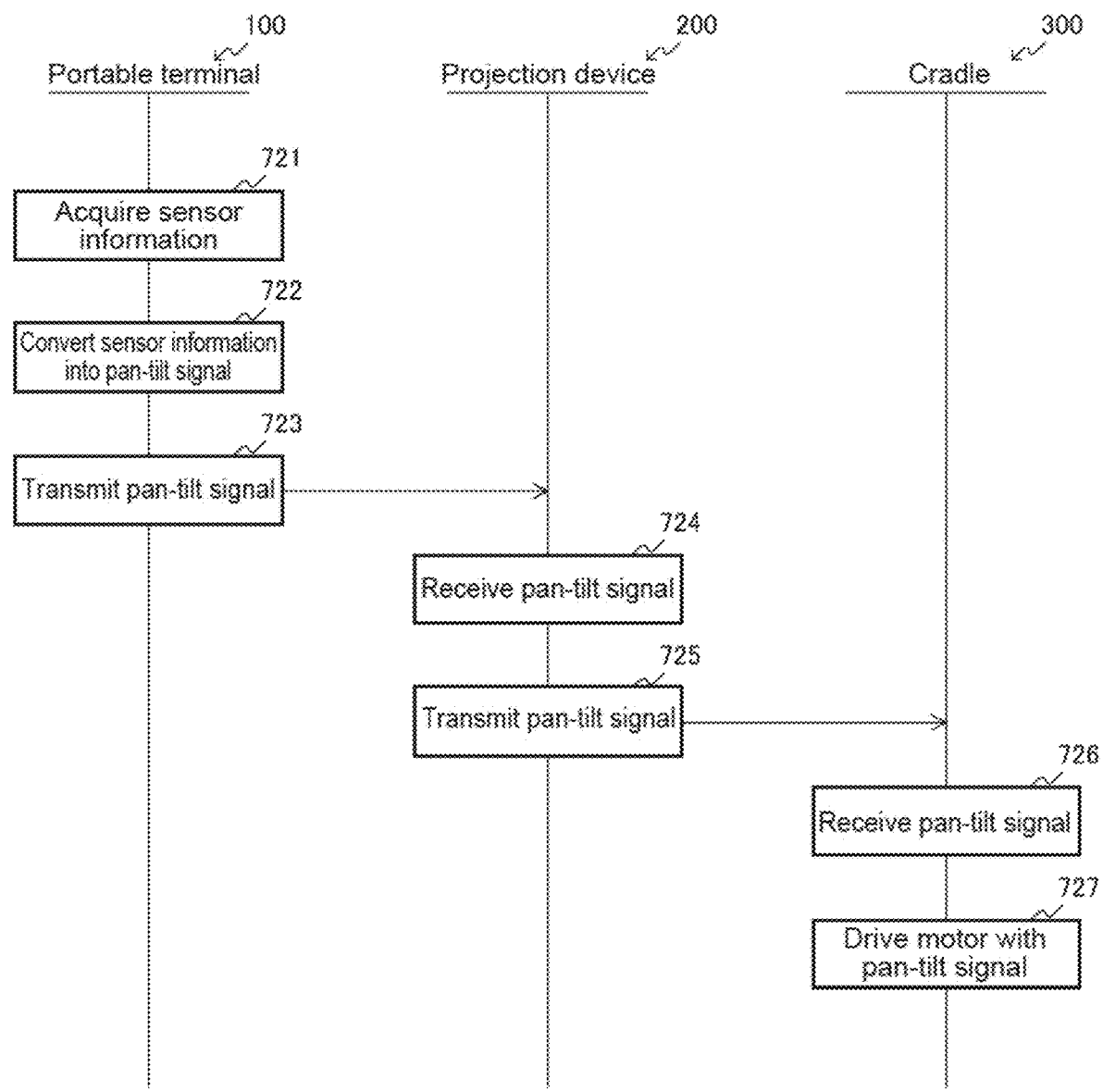
FIG. 4 is a sequence diagram showing a second example of the operation of the projection system according to the first embodiment of the present technology.

FIG. 4 is a sequence diagram showing a second example of the operation of the projection system according to the first embodiment of the present technology. Assumption is made that the pan-tilt signal is generated in the portable terminal 100 in this example, although the processor 210 of the projection device 200 has generated the pan-tilt signal in the above-mentioned example.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection result of the angular velocity and the acceleration (721). Then, the processor 110 converts the sensor information into a pan-tilt signal for driving a motor (722). The short-range wireless communication unit 180 of the portable terminal 100 transmits this pan-tilt signal to the projection device 200 (723).

The short-range wireless communication unit 280 of the projection device 200 receives the pan-tilt signal from the portable terminal 100 (724). The processor 210 of the projection device 200 transmits the pan-tilt signal to the cradle 300 through electrical connection (726).

The processor 310 of the cradle 300 receives the pan-tilt signal from the projection device 200 (727). The processor 310 supplies the pan-tilt signal to the motor driving unit 350. The motor driving unit 350 drives the motor 360 with the pan-tilt signal (729). This operation in the cradle 300 is similar to that in the above-mentioned first example.

Figure 5:
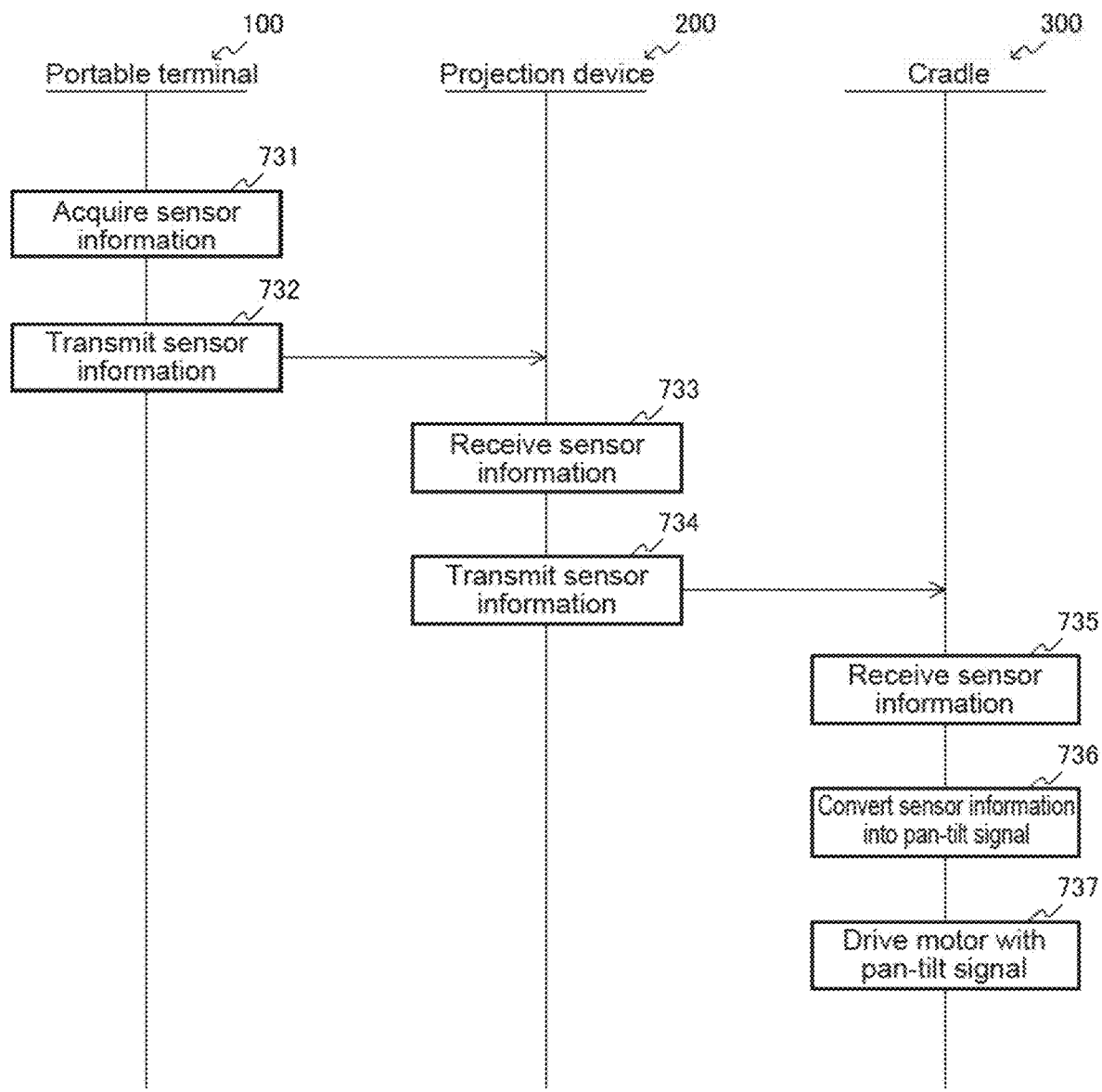
FIG. 5 is a sequence diagram showing a third example of the operation of the projection system according to the first embodiment of the present technology.

FIG. 5 is a sequence diagram showing a third example of the operation of the projection system according to the first embodiment of the present technology. Assumption is made that the pan-tilt signal is generated in the cradle 300 in this example, although the portable terminal 100 or the projection device 200 has generated the pan-tilt signal in the above-mentioned example.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (731). The short-range wireless communication unit 180 of the portable terminal 100 transmits this sensor information to the projection device 200 (733). This operation in the portable terminal 100 is similar to that in the above-mentioned first example.

The short-range wireless communication unit 280 of the projection device 200 receives the sensor information from the portable terminal 100 (734). The processor 210 of the projection device 200 transmits the sensor information to the cradle 300 through electrical connection (736).

The processor 310 of the cradle 300 receives the sensor information from the projection device 200 (737). Then, the processor 310 converts the sensor information into a pan-tilt signal for driving a motor (738). The processor 310 supplies the pan-tilt signal to the motor driving unit 350. The motor driving unit 350 drives the motor 360 with the pan-tilt signal (739).

[Application Example of Projection System]

Figure 6:
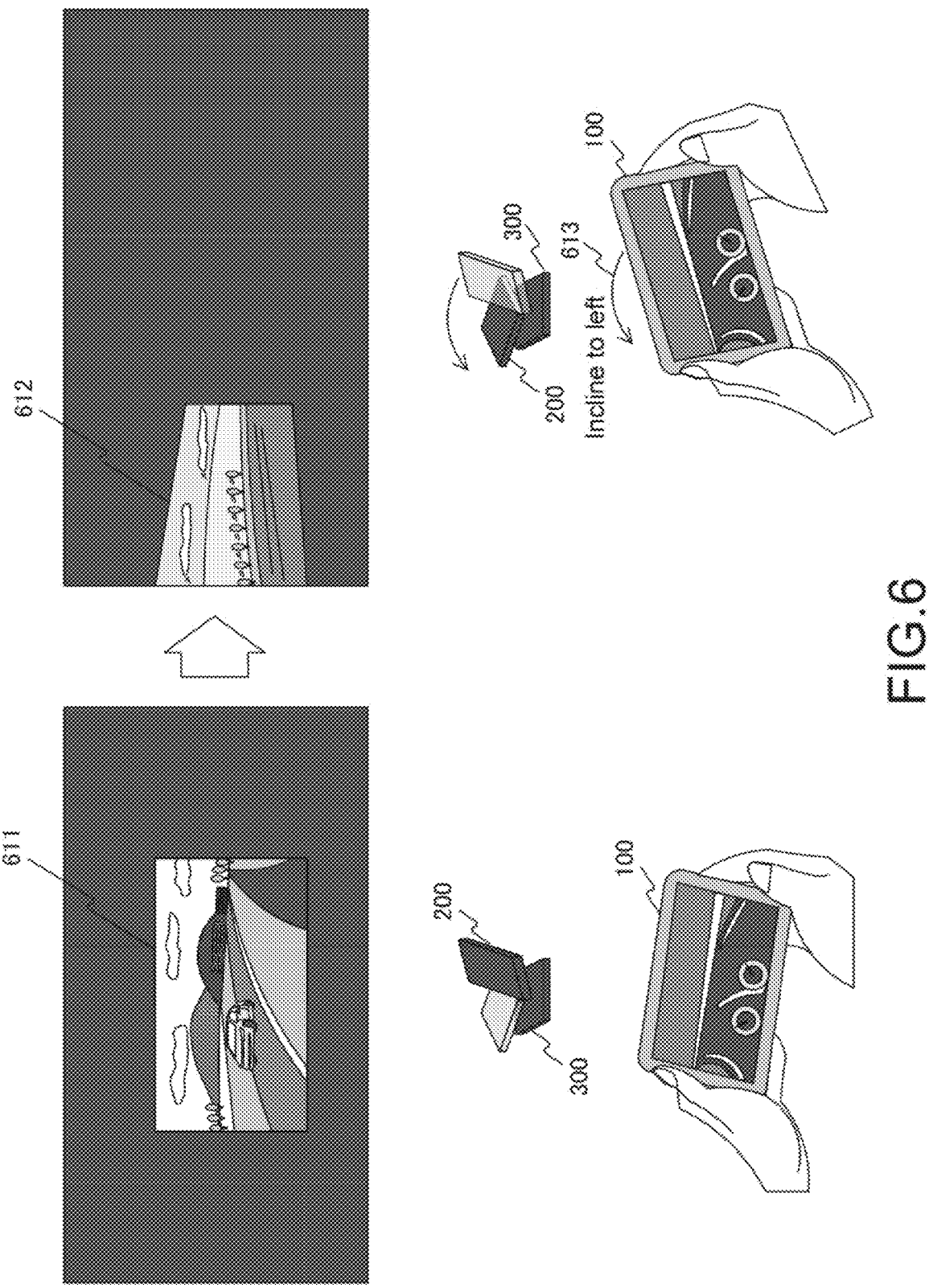
FIG. 6 is a diagram showing a first application example of the projection system according to the first embodiment of the present technology.

FIG. 6 is a diagram showing a first application example of the projection system according to the first embodiment of the present technology. This application example assumes a drive game. Using the gyro sensor 130 and the acceleration sensor 140 of the portable terminal 100, a pan-tilt operation of the projection device 200 can be performed by inclination. As a result, by inclining the portable terminal 100 like tuning a handle, it is possible to project video in the inclined direction.

In the case where a user holds the portable terminal 100 horizontally, video 611 projected from the projection device 200 is projected on the central part of the projection surface. When the user inclines the portable terminal 100 to the left side (613), the change in posture of the portable terminal 100 is transmitted to the cradle 300 via the projection device 200, and the cradle 300 inclines the projection device 200 to the left side. As a result, movie 612 projected from the projection device 200 is projected on the left side of the projection surface. In this way, it is possible to display, as video, the scene viewed from the driver's seat in a particular direction as if the driver turns the handle during driving.

Figure 7:
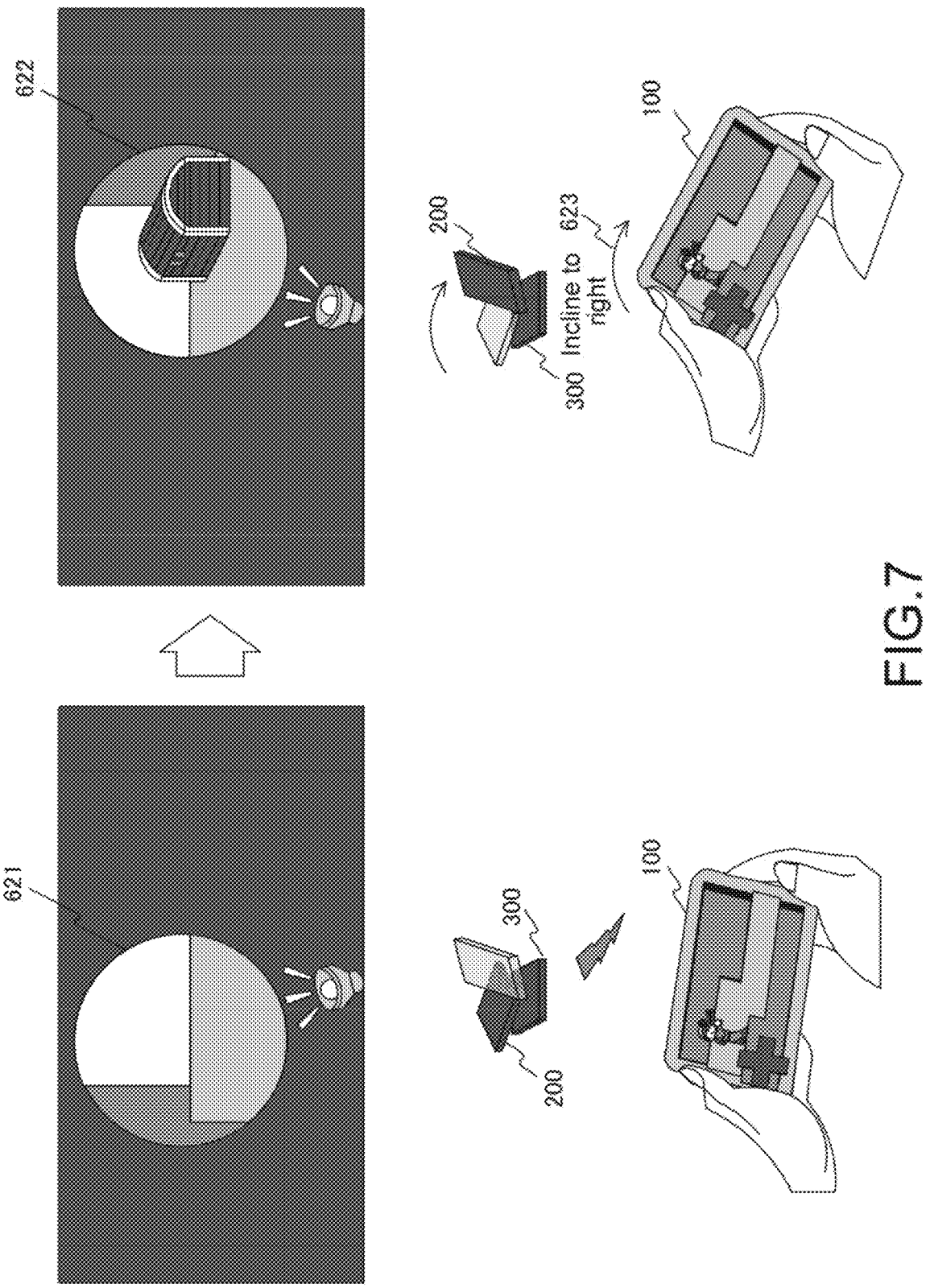
FIG. 7 is a diagram showing a second application example of the projection system according to the first embodiment of the present technology.

FIG. 7 is a diagram showing a second application example of the projection system according to the first embodiment of the present technology. This application example assumes a labyrinth (dungeon) exploration game. By enabling the pan-tilt operation of the projection device 200 by the inclination of the portable terminal 100, it is possible to project video in the labyrinth in the inclined direction by inclining the portable terminal 100 like swinging a search light. At this time, the map of the labyrinth and the position of the character can be displayed on the screen of the portable terminal 100. That is, it is possible to project, from the projection device 200, video different from the screen display of the portable terminal 100.

In the case where a user holds the portable terminal 100 horizontally, the position of video 621 projected from the projection device 200 does not change on the projection surface. When the user inclines the portable terminal 100 to the right side (623), the change in posture of the portable terminal 100 is transmitted to the cradle 300 via the projection device 200, and the cradle 300 inclines the projection device 200 to the right side. As a result, the position of video 622 projected from the projection device 200 changes to the right side. In this way, it is possible to display video as if the operation of swinging the search light were performed in the labyrinth, and find a treasure chest as in this example.

FIG. 8 is a diagram showing a third application example of the projection system according to the first embodiment of the present technology. This application example assumes an FPS (First-Person Shooter) game. This FPS game is a type of game in which he/she moves in the space in the game from the viewpoint of the main character and fights against the enemy. By enabling the pan-tilt operation of the projection device 200 by the inclination of the portable terminal 100, arbitrary video can be projected as if the target were enlarged and displayed from the rifle scope. At this time, display in the person's light of sight or display of an interface for performing the operation of moving the character can be performed on the screen of the portable terminal 100. That is, it is possible to project, from the projection device 200, video different from the screen display of the portable terminal 100.

In the case where a user holds the portable terminal 100 horizontally, the position of video 631 projected from the projection device 200 does not change on the projection surface. When the user inclines the portable terminal 100 to the right side (633), the change in posture of the portable terminal 100 is transmitted to the cradle 300 via the projection device 200, and the cradle 300 inclines the projection device 200 to the right side. As a result, the position of video 632 projected from the projection device 200 changes to the right side. In this way, it is possible to display video as if the operation of swinging the rifle were performed while watching the rifle scope, and find the enemy soldier as in this example.

Figure 9:
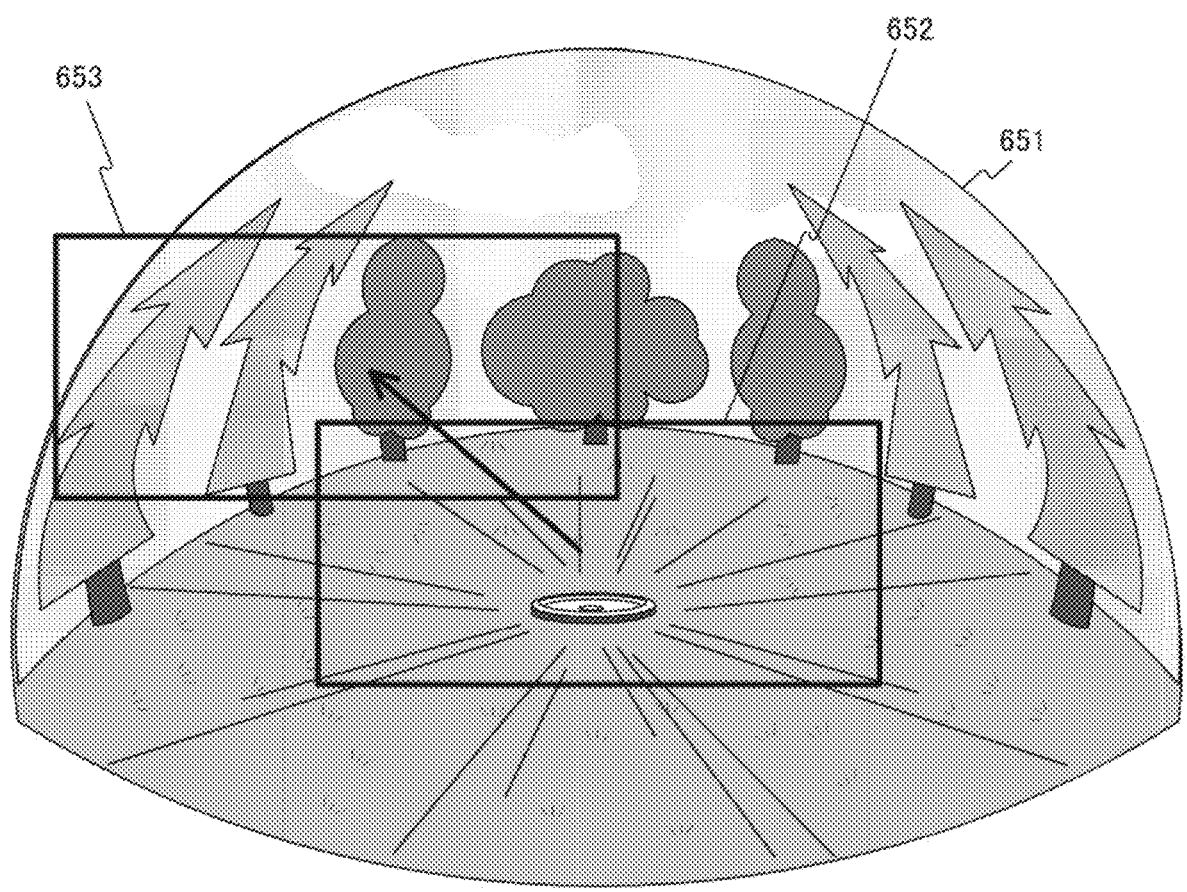
FIG. 9 is a diagram showing a video example in a fourth application example of the projection system according to the first embodiment of the present technology.
Figure 10:
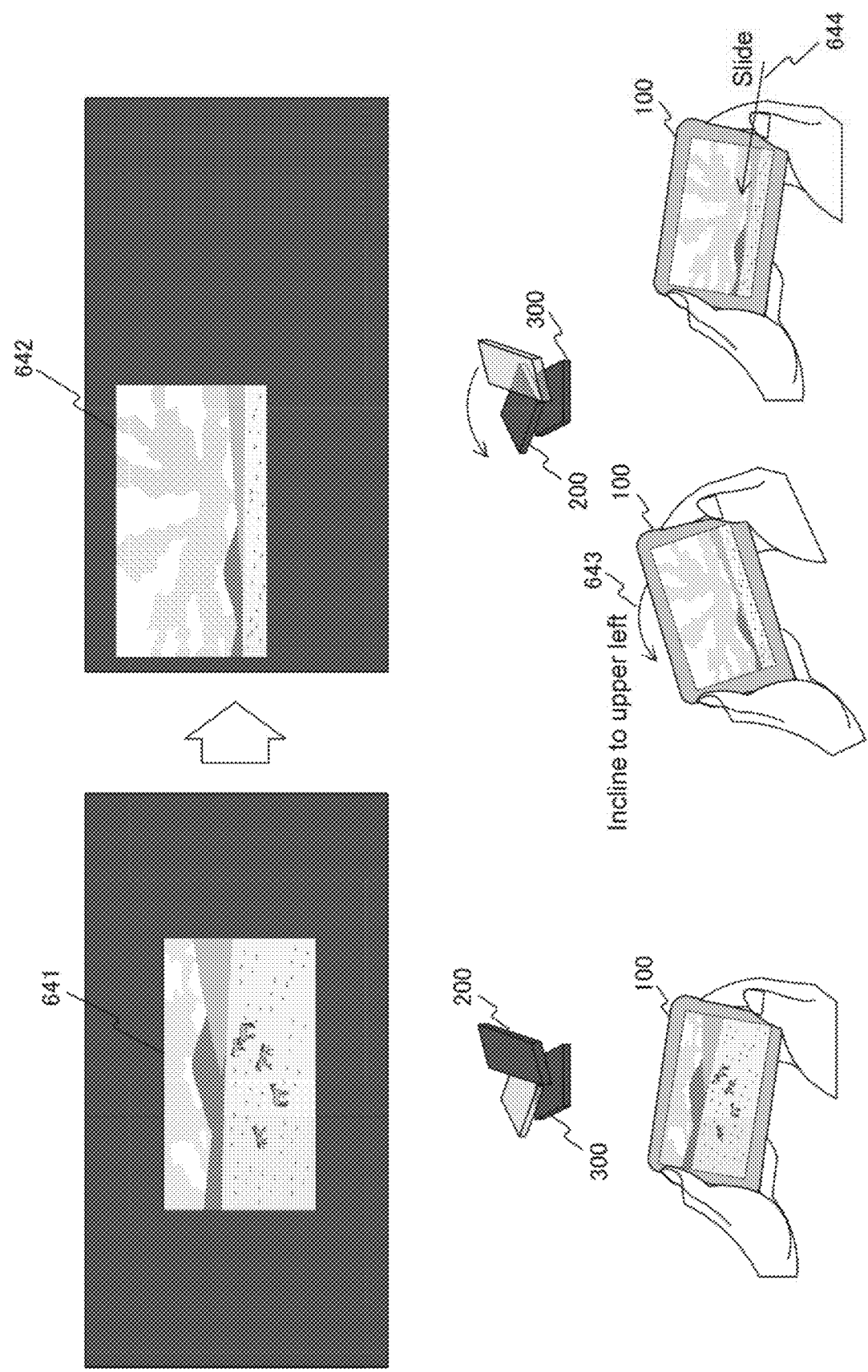
FIG. 10 is a diagram showing the fourth application example of the projection system according to the first embodiment of the present technology.

FIG. 9 and FIG. 10 are each a diagram showing a fourth application example of the projection system according to the first embodiment of the present technology. This application example assumes 360-degree video display. By enabling the pan-tilt operation of the projection device 200 by the inclination or sliding of the portable terminal 100, it is possible to project video in a desired direction of the 360-degree video.

For example, as shown in FIG. 9, in the case where a slide operation in the upper left direction is performed on the portable terminal 100 when video 652 of a particular part is displayed in 360-degree video 651, video 653 of the part in the upper left direction can be displayed.

Further, as shown in FIG. 10, in the case where a user holds the portable terminal 100 horizontally, the position of video 641 projected from the projection device 200 does not change on the projection surface. When the user inclines the portable terminal 100 to the upper left (643) or slides the portable terminal 100 to the upper left (644), the change in posture of the portable terminal 100 is transmitted to the cradle 300 via the projection device 200, and the cradle 300 inclines the projection device 200 to the upper left. As a result, the position of video 642 projected from the projection device 200 changes to the upper left. In this way, it is possible to project 360-degree video of the part desired by the user in such a way that video in the direction of moving the portable terminal 100 is displayed. That is, this embodiment is applicable not only to the above-mentioned example of the game but also to image display in general, and can be widely applied to, for example, AR (Augmented Reality).

As described above, in the first embodiment of the present technology, the detection result of the change in posture of the portable terminal 100 is transferred to the cradle 300 via the projection device 200. As a result, the cradle 300 changes the posture of the projection device 200 in accordance with the change in posture of the portable terminal 100, and the projection position of video can be changed in conjunction with the change in posture of the portable terminal 100.

[First Modified Example]

Figure 11:
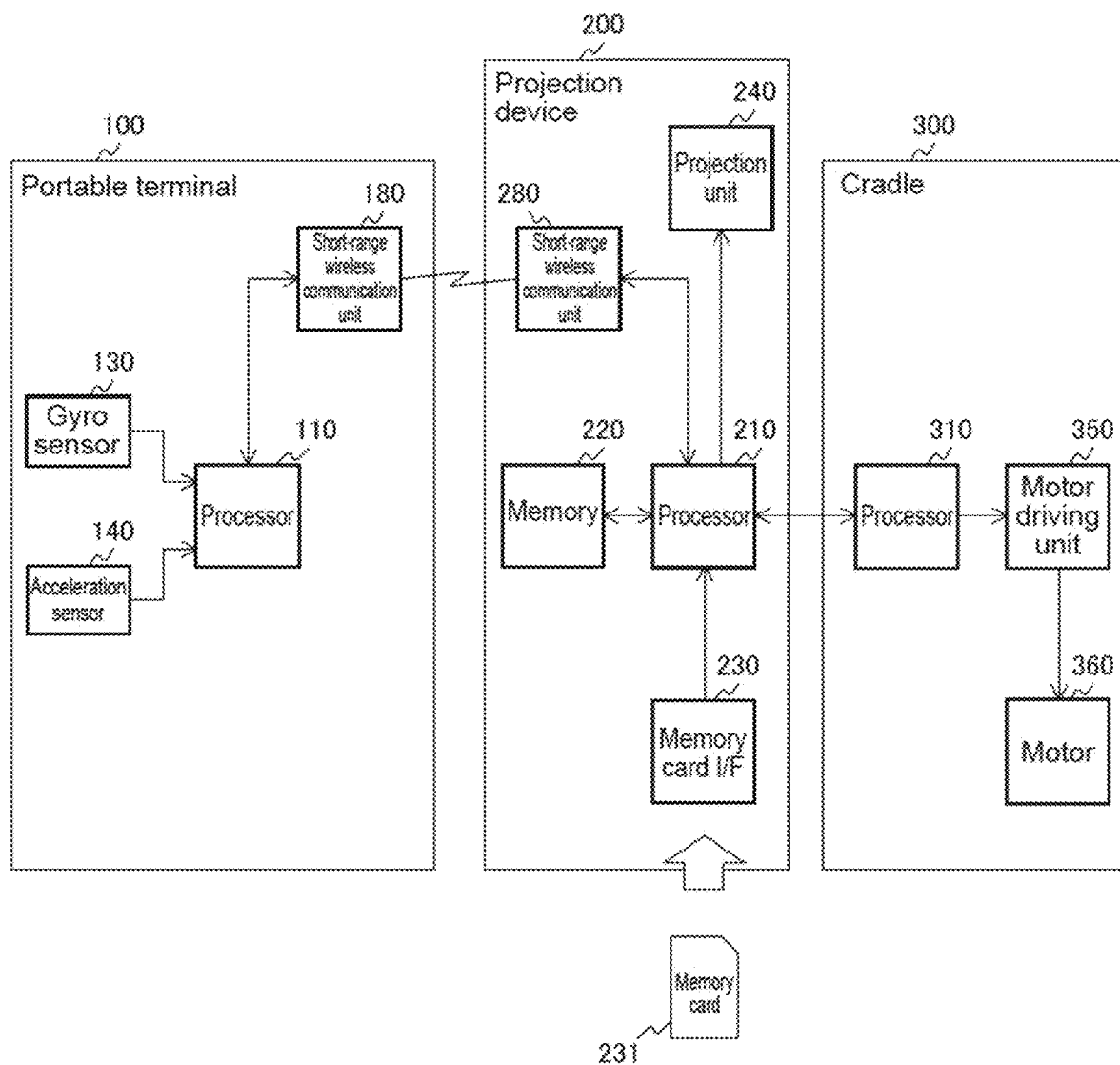
FIG. 11 is a diagram showing a first modified example of the projection system according to the first embodiment of the present technology.

FIG. 11 is a diagram showing a first modified example of the projection system according to the first embodiment of the present technology. In the above-mentioned embodiment, the network communication unit has supplied a video signal from the portable terminal 100 to the projection device 200. However, the video signal may be supplied by using another method. In this first modified example, assumption is made that video stored in a memory card 231 is displayed.

In this first modified example, the projection device 200 includes a memory card interface 230. This memory card interface 230 is an interface for reading video stored in the memory card 231. The processor 210 of the projection device 200 reads video stored in the memory card 231 via the memory card interface 230, and stores it in the memory 220. Then, the processor 210 performs processing of reproducing the video signal stored in the memory 220. Since other configurations are similar to those in the above-mentioned embodiment, detailed description thereof will be omitted. Note that the memory 220 and the memory card 231 are each an example of a storage unit described in claims.

[Second Modified Example]

Figure 12:
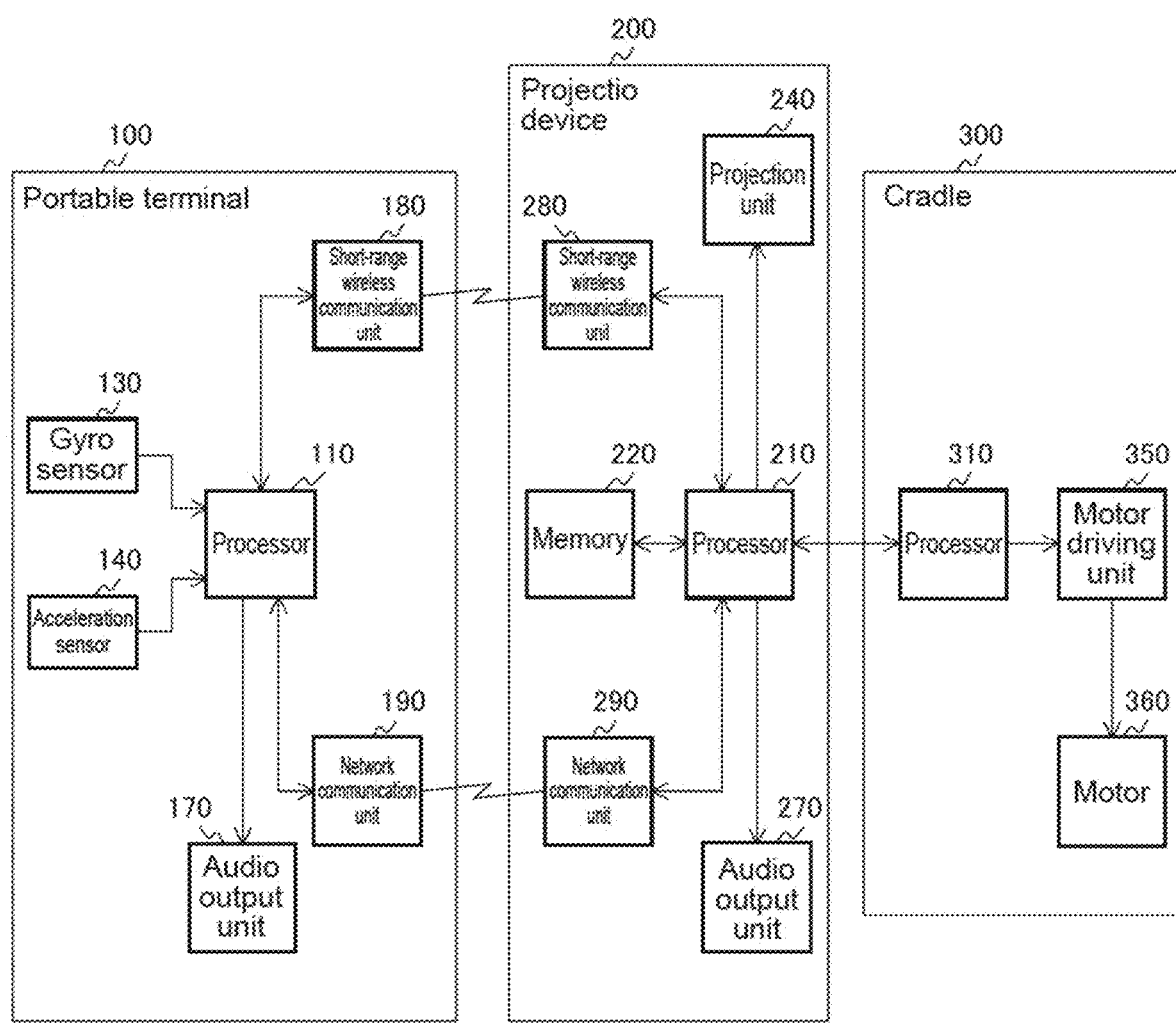
FIG. 12 is a diagram showing a second modified example of the projection system according to the first embodiment of the present technology.

FIG. 12 is a diagram showing a second modified example of the projection system according to the first embodiment of the present technology. In this second modified example, the portable terminal 100 includes an audio output unit 170, and the projection device 200 includes an audio output unit 270. Note that the audio output unit 170 is an example of a first audio output unit described in claims, and the audio output unit 270 is an example of a second audio output unit described in claims.

The audio output unit 170 and the audio output unit 270 are capable of outputting different audio. For example, the audio output unit 170 of the portable terminal 100 outputs BGM (Back Ground Music) of a game while the audio output unit 270 of the projection device 200 outputs a generated sound (e.g., a metal detection sound in a labyrinth) or the like in video. As a result, it is possible to improve the realistic feeling or the like on the projection surface by the projection device 200.

[Third Modified Example]

In the above-mentioned embodiment, assumption has been made that one portable terminal 100, one projection device 200, and one cradle 300 are provided. However, a plurality of these may be provided as a whole system. In this case, assumption is made that a plurality of sets are provided, each of the plurality of sets including the projection device 200, the cradle 300, and the portable terminal 100, a pair of the projection device 200 and the cradle 300 corresponding to one portable terminal 100. For example, a game character is assigned to each of the portable terminals 100, and the projection position of the character is changed in accordance with the change in posture of the corresponding portable terminal 100. As a result, it is possible to realize a game in which the characters work in cooperation with each other.

<2. Second Embodiment>

[Configuration of Projection System]

Figure 13:
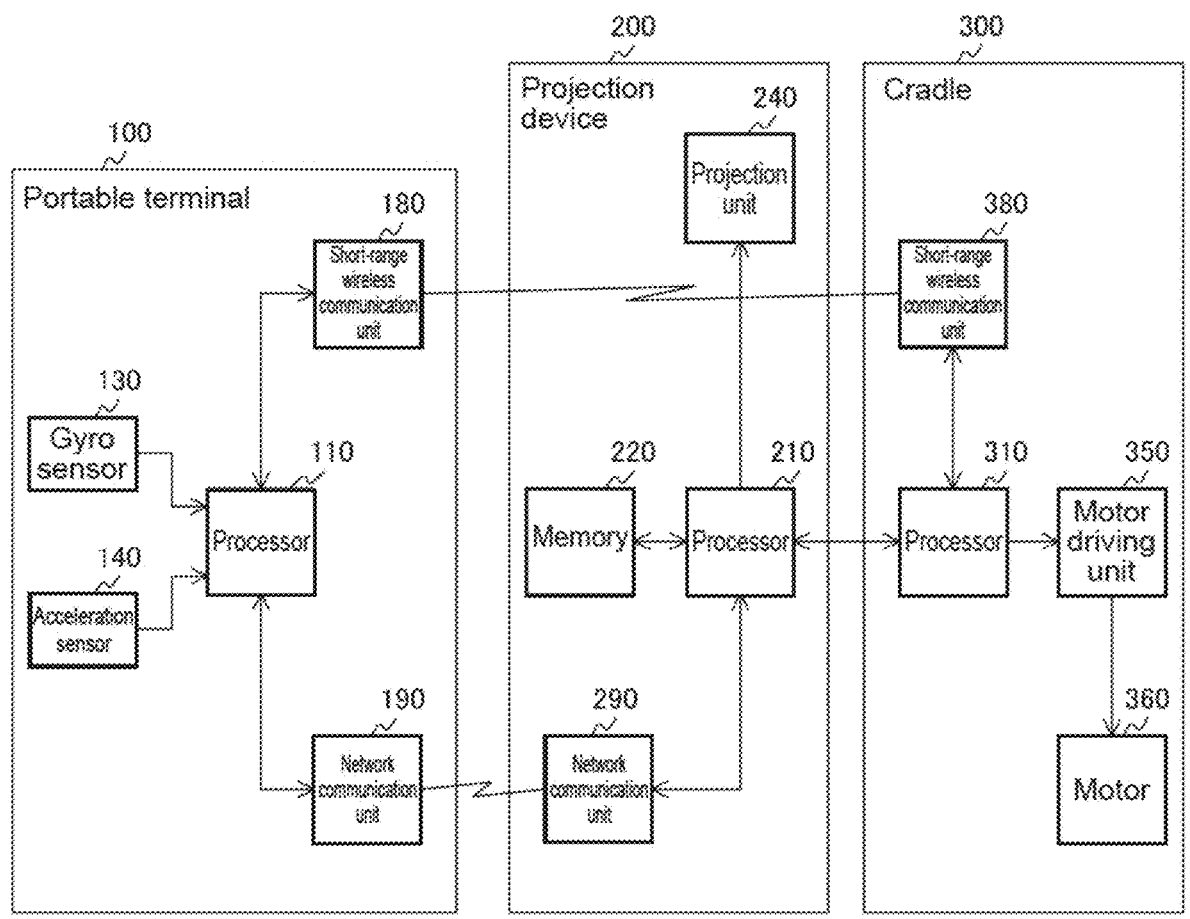
FIG. 13 is a diagram showing a function configuration example of the projection system according to a second embodiment of the present technology.

FIG. 13 is a diagram showing a functional configuration example of the projection system according to the second embodiment of the present technology.

In this second embodiment, the detection result of the change in posture detected in the portable terminal 100 is supplied to the cradle 300 directly without passing through the projection device 200. Therefore, in this second embodiment, the cradle 300 includes a short-range wireless communication unit 380, and performs short-range wireless communication with the portable terminal 100. With this short-range wireless communication, the cradle 300 receives the detection result acquired by the gyro sensor 130 and the acceleration sensor 140 of the portable terminal 100. Since other configurations are similar to those I the above-mentioned embodiment, detailed description thereof will be omitted.

[Operation of Projection System]

Figure 14:
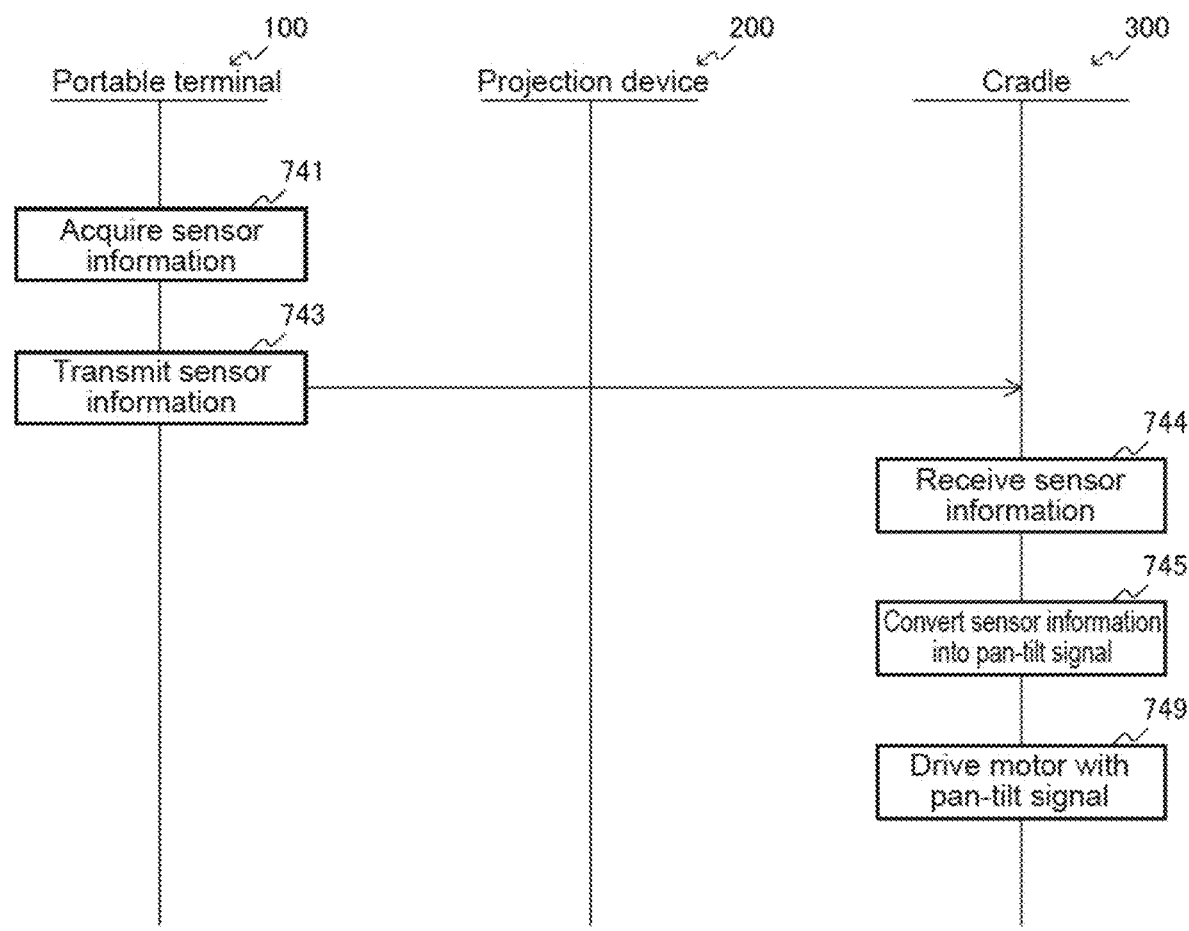
FIG. 14 is a sequence diagram showing a first example of an operation of the projection system according to the second embodiment of the present technology.

FIG. 14 is a sequence diagram showing a first example of the operation of the projection system according to the second embodiment of the present technology.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (741). The short-range wireless communication unit 180 of the portable terminal 100 transmits this sensor information to the cradle 300 (743).

The short-range wireless communication unit 380 of the cradle 300 receives sensor information from the portable terminal 100 (744). Then, the processor 310 of the cradle 300 converts the sensor information into a pan-tilt signal for driving a motor (745). The processor 310 supplies the pan-tilt signal to the motor driving unit 350. The motor driving unit 350 drives the motor 360 with the pan-tilt signal (749).

Note that although omitted in this figure, video is projected from the projection unit 240 of the projection device 200 in parallel with this.

Figure 15:
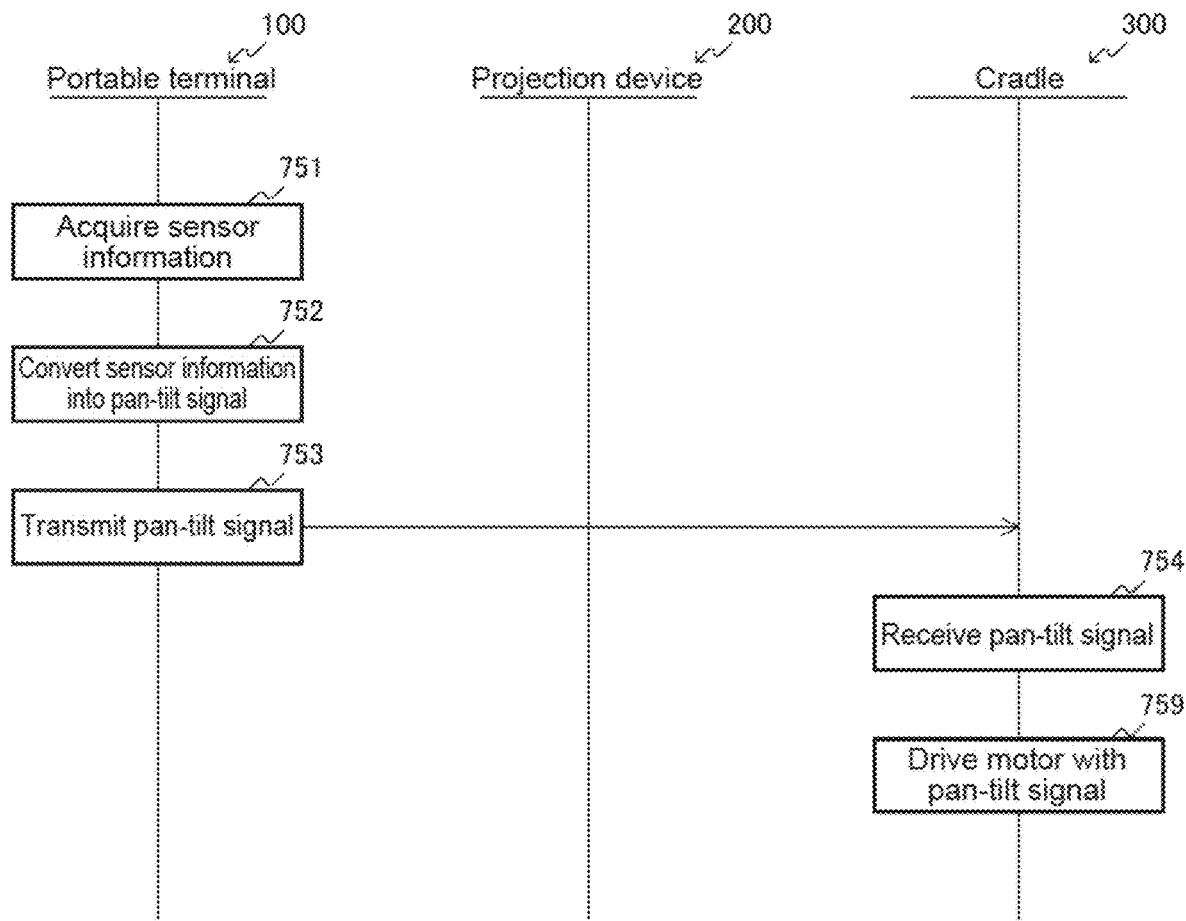
FIG. 15 is a sequence diagram showing a second example of the operation of the projection system according to the second embodiment of the present technology.

FIG. 15 is a sequence diagram showing a second example of the operation of the projection system according to the second embodiment of the present technology. Assumption is made that the pan-tilt signal is generated in the portable terminal 100 in this example, although the processor 310 of the cradle 300 has generated the pan-tilt signal in the above-mentioned example.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (751). Then, the processor 110 converts the sensor information into a pan-tilt signal for driving a motor (752). The short-range wireless communication unit 180 of the portable terminal 100 transmits this pan-tilt signal to the cradle 300 (753).

The short-range wireless communication unit 380 of the cradle 300 receives the pan-tilt signal from the portable terminal 100 (754). The processor 310 supplies the pan-tilt signal to the motor driving unit 350. The motor driving unit 350 drives the motor 360 with the pan-tilt signal (759).

As described above, in the second embodiment of the present technology, the detection result of the change in posture of the portable terminal 100 is transferred to the cradle 300 directly without passing through the projection device 200. As a result, the cradle 300 changes the posture of the projection device 200 in accordance with the change in posture of the portable terminal 100, and the projection position of video can be changed in conjunction with the change in posture of the portable terminal 100.

Note that the first to third modified examples described in the above-mentioned first embodiment is applicable also to this second embodiment.

<3. Third Embodiment>

[Configuration of Projection System]

Figure 16:
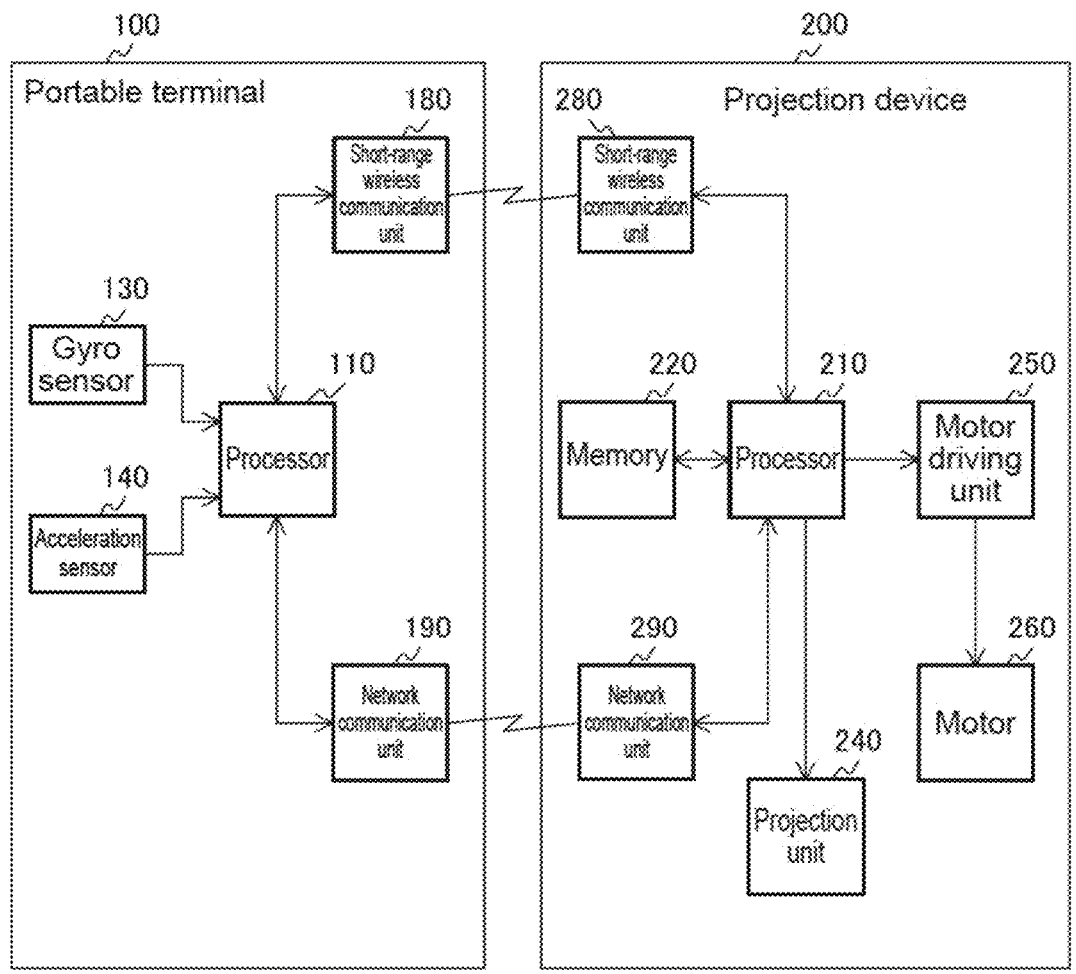
FIG. 16 is a diagram showing a functional configuration example of a projection system according to a third embodiment of the present technology.

FIG. 16 is a diagram showing a functional configuration example of a projection system according to a third embodiment of the present technology. Assumption has been made that the projection device 200 and the cradle 300 are configured as independent apparatuses in the above-mentioned first and second embodiments. However, in this third embodiment, assumption is made that the projection device 200 includes a motor and has a function similar to that of the cradle. That is, the projection device and the cradle are configured as an integrated apparatus.

The projection device 200 according to this third embodiment includes a motor driving unit 250 and a motor 260 in addition to the processor 210, the memory 220, the projection unit 240, the short-range wireless communication unit 280, and the network communication unit 290. The motor 260 is a power source that generates power for causing the projection device 200 to rotate vertically and horizontally. For example, a stepping motor is assumed as the motor 260. The motor driving unit 250 is a mechanism for driving the motor 260.

Since other configurations are similar to those in the above-mentioned first and second embodiments, detailed description thereof will be omitted.

[Operation of Projection System]

Figure 17:
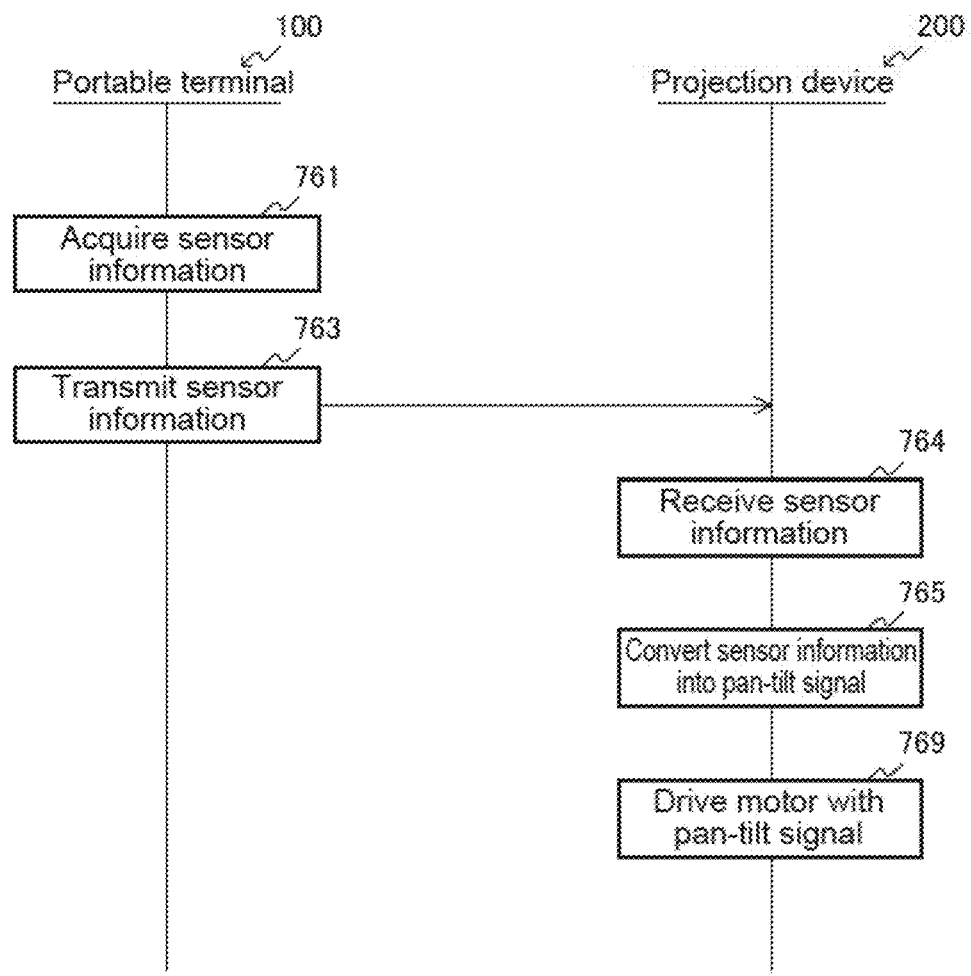
FIG. 17 is a sequence diagram showing a first example of an operation of the projection system according to the third embodiment of the present technology.

FIG. 17 is a sequence diagram showing a first example of the operation of a projection system according to the third embodiment of the present technology.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (761). The short-range wireless communication unit 180 of the portable terminal 100 transmits this sensor information to the projection device 200 (763).

The short-range wireless communication unit 280 of the projection device 200 receives the sensor information from the portable terminal 100 (764). Then, the processor 210 of the projection device 200 converts the sensor information into a pan-tilt signal for driving a motor (765). The processor 210 supplies the pan-tilt signal to the motor driving unit 250. The motor driving unit 250 drives the motor 260 with the pan-tilt signal (769).

Note that although omitted in the figure, video is projected from the projection unit 240 of the projection device 200 in parallel with this.

Figure 18:
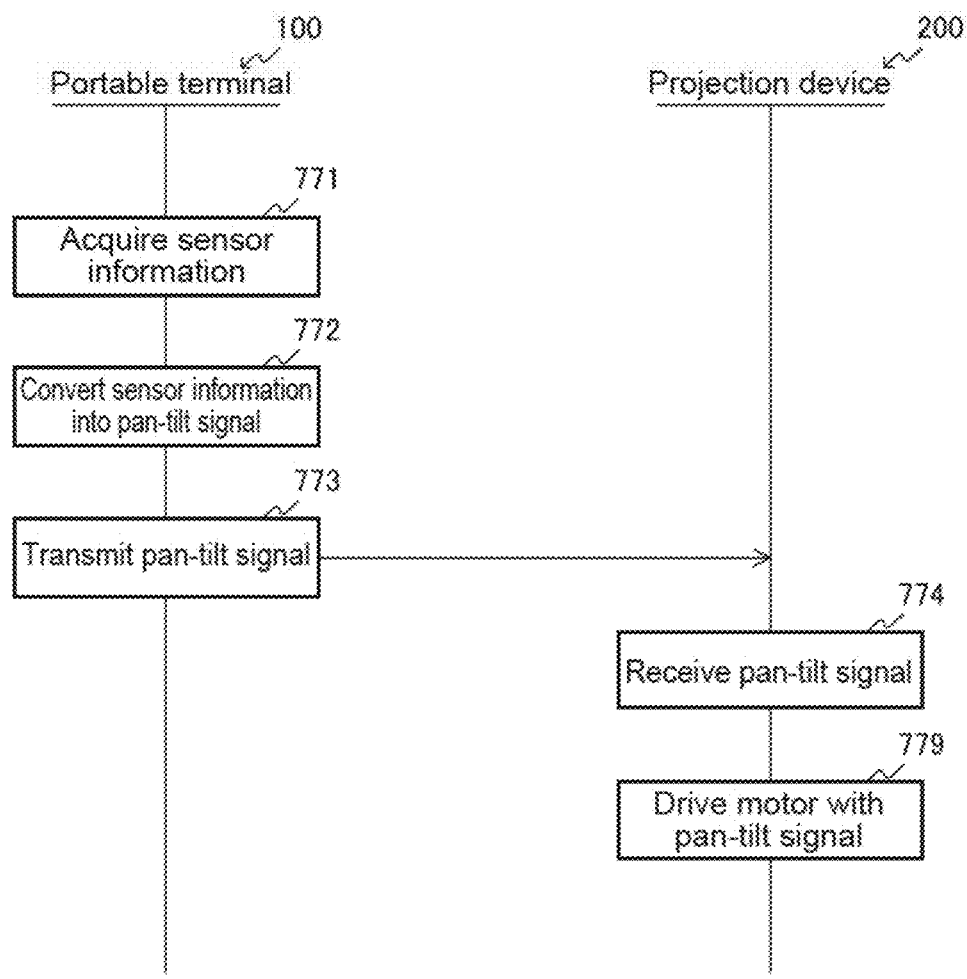
FIG. 18 is a sequence diagram showing a second example of the operation of the projection system according to the third embodiment of the present technology.

FIG. 18 is a sequence diagram showing a second example of the projection system according to the third embodiment of the present technology. Assumption is made that the pan-tilt signal is generated in the portable terminal 100 in this example, although the projection device 200 has generated pan-tilt signal in the above-mentioned example.

When the posture of the portable terminal 100 changes, the gyro sensor 130 and the acceleration sensor 140 respectively detect the angular velocity and the acceleration. As a result, the processor 110 of the portable terminal 100 acquires sensor information that is the detection results of the angular velocity and the acceleration (771). Then, the processor 110 converts the sensor information into a pan-tilt signal for driving a motor (772). The short-range wireless communication unit 180 of the portable terminal 100 transmits this pan-tilt signal to the projection device 200 (773).

The short-range wireless communication unit 280 of the projection device 200 receives the pan-tilt signal from the portable terminal 100 (774). The processor 210 of the projection device 200 supplies the pan-tilt signal to the motor driving unit 250. The motor driving unit 250 drives the motor 260 with the pan-tilt signal (779).

As described above, in the third embodiment of the present technology, the detection result of the change in posture of the portable terminal 100 is transferred to the projection device 200. As a result, the projection device 200 changes the posture the projection device 200 itself in accordance with the change in posture of the portable terminal 100, and the projection position of video can be changed in conjunction with the change in posture of the portable terminal 100.

Note that the first to third modified examples described in the above-mentioned first embodiment are applicable also to this third embodiment.

As described above, in the embodiments of the present technology, it is possible to change the projection position of video in conjunction with the change in posture of the portable terminal 100 by changing the posture of the projection device 200 in accordance with the detection result of the change in posture of the portable terminal 100.

Note that although assumption has been made that the posture of the projection device 200 is changed in accordance with the detection result of the change in posture of the portable terminal 100, the posture of the projection device 200 may be changed in accordance with the operation on the screen in the portable terminal 100. For example, the projection device 200 may be caused to rotate in the case where the user has instructed a change in video by an operation (tap operation) of hitting the screen of the portable terminal 100 or an operation (slide operation) of tracing the screen.

Note that the above-mentioned embodiments each show an example for embodying the present technology, and the matters in the embodiment and the invention specifying matters in claims have correspondences. Similarly, the invention specifying matters in claims and the matters in the embodiment to which the same names as these have correspondences. However, the present technology is not limited to the embodiments, and can be embodied by making various modifications to the embodiments without departing from the essence of the present technology.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray (registered trademark) disc can be used, for example.

Note that the effects described herein are merely examples and not limitative and other effects may be provided.

It should be noted that the present technology may take the following configurations.

(1) A projection system, including:
a portable terminal that detects a change in posture of the portable terminal itself;
a projection device that reproduces a video signal, and projects the video signal on a projection surface; and
a cradle that supports the projection device, and changes posture of the projection device in accordance with a detection result of the portable terminal.

(2) The projection system according to (1) above, in which
the portable terminal detects the change in posture by using at least one of an acceleration sensor or a gyro sensor.

(3) The projection system according to (2) above, in which
the cradle includes a motor that changes the posture of the projection device, and a motor driving unit that drives the motor, and
one of the portable terminal, the projection device, and the cradle includes a control signal generation unit that generates a control signal for driving the motor on a basis of the change in posture of the portable terminal.

(4) The projection system according to any one of (1) to (3) above, in which
the portable terminal supplies the video signal to the projection device.

(5) The projection system according to any one of (1) to (3) above, in which
the projection device includes a storage unit that stores the video signal, and reads the video signal from the storage unit to perform the reproduction.

(6) The projection system according to any one of (1) to (5) above, in which
the portable terminal includes a first audio output unit,
the projection device includes a second audio output unit, and
the first and the second audio output units output different audio signals corresponding to the video signal.

(7) The projection system according to any one of (1) to (6) above, including
a plurality of sets, each of the plurality of sets including the portable terminal, the projection device, and the cradle.

(8) A projection device, including:
a detection signal reception unit that receives a change in posture of a portable terminal as a detection result;
a control signal generation unit that generates a control signal for changing posture of the projection device itself on a basis of the detection result;
a control signal transmission unit that transmits the control signal to a cradle for supporting the projection device itself; and
a projection unit that projects a video signal in a projection direction based on the detection result.

(9) A projection device, including:
a detection signal reception unit that receives a change in posture of a portable terminal as a detection result;
a control signal generation unit that generates a control signal for changing posture of the projection device itself on a basis of the detection result;
a motor that changes the posture of the projection device;
a motor driving unit that drives the motor in accordance with the control signal; and a projection unit that projects a video signal in a projection direction based on the detection result.

(10) A cradle that supports a projection device, including:
a detection signal reception unit that receives a change in posture of a portable terminal as a detection result;
a motor that changes posture of the projection device;
a control signal generation unit that generates a control signal for driving the motor on a basis of the detection result; and
a motor driving unit that drives the motor in accordance with the control signal.

REFERENCE SIGNS LIST 100 portable terminal
110 processor
130 gyro sensor
140 acceleration sensor
170 audio output unit
180 short-range wireless communication unit
190 network communication unit
200 projection device
210 processor
220 memory
230 memory card interface
231 memory card
240 projection unit
250 motor driving unit
260 motor
270 audio output unit
280 short-range wireless communication unit
290 network communication unit
300 cradle
310 processor
350 motor driving unit
360 motor
380 short-range wireless communication unit

The invention claimed is:

1. A projection system, comprising:
a portable terminal that detects a change in posture of the portable terminal itself;
a projection device that reproduces a video signal, and projects the video signal on a projection surface; and
a cradle that supports the projection device, and changes posture of the projection device in accordance with a detection result of the portable terminal.

2. The projection system according to claim 1, wherein the portable terminal detects the change in posture by using at least one of an acceleration sensor or a gyro sensor.

3. The projection system according to claim 2, wherein the cradle includes a motor that changes the posture of the projection device, and a motor driving unit that drives the motor, and
one of the portable terminal, the projection device, and the cradle includes a control signal generation unit that generates a control signal for driving the motor on a basis of the change in posture of the portable terminal.

4. The projection system according to claim 1, wherein the portable terminal supplies the video signal to the projection device.

5. The projection system according to claim 1, wherein the projection device includes a storage unit that stores the video signal, and reads the video signal from the storage unit to perform the reproduction.

6. The projection system according to claim 1, wherein the portable terminal includes a first audio output unit,
the projection device includes a second audio output unit, and
the first and the second audio output units output different audio signals corresponding to the video signal.

7. The projection system according to claim 1, comprising a plurality of sets, each of the plurality of sets including the portable terminal, the projection device, and the cradle.

8. A projection device, comprising:
a detection signal reception device that receives a change in posture of a portable terminal as a detection result;
a control signal generation device that generates a control signal for changing posture of the projection device itself on a basis of the detection result;
a control signal transmission device that transmits the control signal to a cradle for supporting the projection device itself; and
a projection device that projects a video signal in a projection direction based on the detection result.

9. A projection device, comprising:
a detection signal reception device that receives a change in posture of a portable terminal as a detection result;
a control signal generation device that generates a control signal for changing posture of the projection device itself on a basis of the detection result;
a motor that changes the posture of the projection device;
a motor driving device that drives the motor in accordance with the control signal; and
a projection device that projects a video signal in a projection direction based on the detection result.

10. A cradle that supports a projection device, comprising:
a detection signal reception device that receives a change in posture of a portable terminal as a detection result;
a motor that changes posture of the projection device;
a control signal generation device that generates a control signal for driving the motor on a basis of the detection result; and
a motor driving device that drives the motor in accordance with the control signal.

* * * * *